United States Patent
Boebinger et al.

(10) Patent No.: US 9,733,725 B2
(45) Date of Patent: Aug. 15, 2017

(54) CONTROL UNIT, INPUT APPARATUS AND METHOD FOR AN INFORMATION AND COMMUNICATION SYSTEM

(71) Applicant: Bayerische Motoren Werke Aktiengesellschaft, Munich (DE)

(72) Inventors: Clemens Boebinger, Dachau (DE); Martin Kuemmel, Markt Schwaben (DE); Michael Nirschl, Obergangkofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 12 days.

(21) Appl. No.: 14/511,888

(22) Filed: Oct. 10, 2014

(65) Prior Publication Data
US 2015/0029106 A1 Jan. 29, 2015

Related U.S. Application Data

(63) Continuation of application No. PCT/EP2013/057318, filed on Apr. 8, 2013.

(30) Foreign Application Priority Data

Apr. 11, 2012 (DE) .................. 10 2012 205 865

(51) Int. Cl.
*G06F 3/023* (2006.01)
*G06F 3/02* (2006.01)
(Continued)

(52) U.S. Cl.
CPC ............ *G06F 3/0238* (2013.01); *B60K 35/00* (2013.01); *B60K 37/06* (2013.01); *G06F 3/0213* (2013.01);
(Continued)

(58) Field of Classification Search
CPC .................................................. G06F 3/04883
See application file for complete search history.

(56) References Cited

U.S. PATENT DOCUMENTS 6,947,062 B2   9/2005   Cuijpers et al.
8,411,040 B2   4/2013   Waeller et al.
(Continued)

FOREIGN PATENT DOCUMENTS

CN     1527970 A     9/2004
CN   101621289 A     1/2010
(Continued)

OTHER PUBLICATIONS

International Search Report dated Jul. 5, 2013 (Two (2) pages).
(Continued)

*Primary Examiner* — Gerald Johnson
(74) *Attorney, Agent, or Firm* — Crowell & Moring LLP

(57) ABSTRACT

The invention relates to the controlling of functions of an information and communication system in a vehicle by means of physical keys. A control unit for an information and communication system of a vehicle is equipped for receiving a sequence of sensor signals of different proximity sensors of corresponding different mechanical function keys, to which corresponding first functions are assigned. The control unit is further equipped for detecting a swiping event over the mechanical function keys, wherein a swiping event comprises the fact that the sequence of sensor signals corresponds to the sensor signals of proximity sensors of corresponding adjacent mechanical function keys. The control unit is further equipped for assigning corresponding second functions to the mechanical function keys when a swiping event is detected.

15 Claims, 4 Drawing Sheets

(51) Int. Cl.
*G06F 3/0485* (2013.01)
*B60K 37/06* (2006.01)
*B60K 35/00* (2006.01)

(52) U.S. Cl.
CPC .... *G06F 3/0485* (2013.01); *B60K 2350/1012* (2013.01); *B60K 2350/1024* (2013.01); *B60K 2350/1052* (2013.01); *G06F 2203/0339* (2013.01)

(56) References Cited

U.S. PATENT DOCUMENTS

| | | | |
|---|---|---|---|
| 8,471,571 | B2 | 6/2013 | Duchene et al. |
| 8,982,051 | B2 | 3/2015 | Rosenfeld et al. |
| 2010/0156821 | A1* | 6/2010 | Juang ............... G06F 3/03547 345/173 |
| 2011/0291474 | A1* | 12/2011 | Salter ................. E05F 15/73 307/10.1 |
| 2012/0011436 | A1 | 1/2012 | Jinkinson et al. |
| 2012/0119997 | A1* | 5/2012 | Gutowitz ............ G06F 3/0219 345/168 |
| 2013/0215038 | A1* | 8/2013 | Senanayake ........ G06F 3/0488 345/169 |
| 2014/0055397 | A1 | 2/2014 | Becker et al. |

FOREIGN PATENT DOCUMENTS

| | | |
|---|---|---|
| CN | 101738218 A | 6/2010 |
| CN | 101923388 A | 12/2010 |
| CN | 201821429 U | 5/2011 |
| CN | 202041218 U | 11/2011 |
| CN | 102378955 A | 3/2012 |
| DE | 195 29 571 A1 | 2/1997 |
| DE | 103 26 215 A1 | 12/2004 |
| DE | 10 2007 005 026 A1 | 8/2008 |
| DE | 10 2006 059 032 B4 | 8/2009 |
| DE | 10 2008 020 251 A1 | 10/2009 |
| DE | 10 2009 031 649 A1 | 1/2011 |
| DE | 10 2010 013 240 A1 | 11/2011 |
| DE | 10 2011 010 229 A1 | 8/2012 |
| JP | S62-37231 A | 2/1987 |
| WO | WO 2004/109491 A2 | 12/2004 |
| WO | WO 2008/054955 A2 | 5/2008 |
| WO | WO 2011/008861 A2 | 1/2011 |

OTHER PUBLICATIONS

German Search Report dated Apr. 8, 2013, with Statement of Relevancy (Six (6) pages).

Chinese Office Action issued in Chinese counterpart application No. 201380026571.6 dated Aug. 3, 2016, with English translation (Ten (10) pages).

Chinese Office Action issued in Chinese counterpart application No. 201380026571.6 dated Mar. 13, 2017, with English translation (Twenty One (21) pges).

* cited by examiner

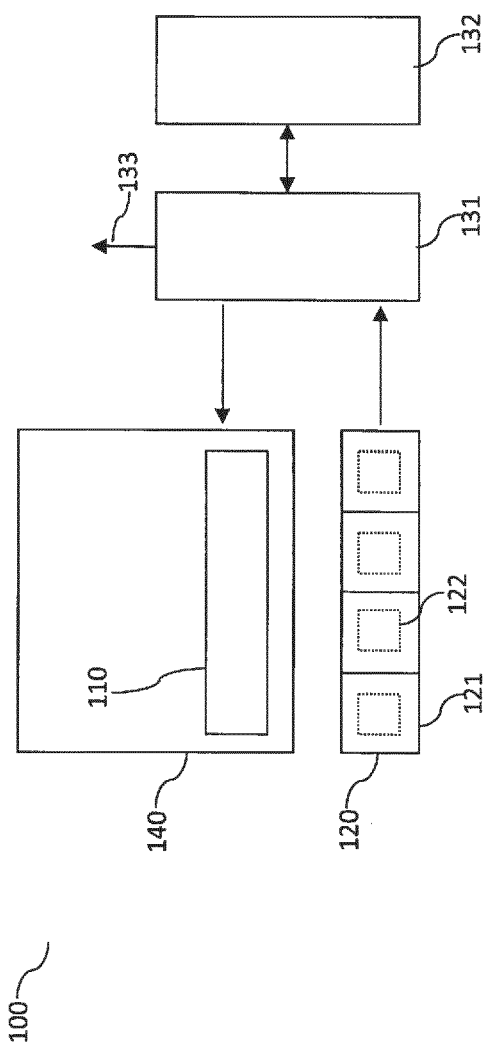

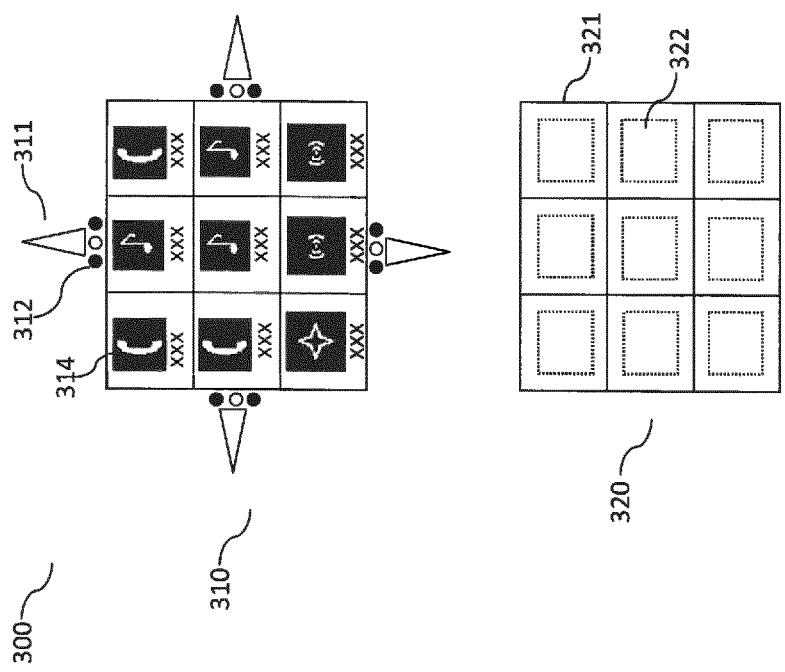

CONTROL UNIT, INPUT APPARATUS AND METHOD FOR AN INFORMATION AND COMMUNICATION SYSTEM

CROSS REFERENCE TO RELATED APPLICATIONS

This application is a continuation of PCT International Application No. PCT/EP2013/057318, filed Apr. 8, 2013, which claims priority under 35 U.S.C. §119 from German Patent Application No. DE 10 2012 205 865.6, filed Apr. 11, 2012, the entire disclosures of which are herein expressly incorporated by reference.

BACKGROUND AND SUMMARY OF THE INVENTION

The invention relates to the controlling of equipment functions by way of physical keys. In particular, the invention relates to the controlling of functions of an information and communication system in a vehicle by means of physical keys.

Today's vehicles (for example, motor vehicles) usually have information and communication systems, which, in a central manner, can provide functions, such as radio, audio, navigation, telephony, air-conditioning control, etc. For controlling the diverse functions, such systems typically have a plurality of physical keys and a video screen. The video screen can, for example, be used for indicating a menu of the information and communication system, and the plurality of physical keys can be used for the navigation within the menu and for the selection/initiation of defined functions.

In order to accelerate the selection of frequently used functions of the information and communication system, physical function keys can be made available with a pressing of the physical function keys directly initiating a preassigned function of the information and communication system. Function keys therefore enable a user to comfortably and rapidly select frequently used functions. However, this is possible only for a limited number of functions because the number of available function keys is generally limited by the space and the desired clarity of the instrument panel of a vehicle (for example, to fewer than 10 function keys).

The present invention describes an input device for an information and communication system (IK System), which permits the allocating of an arbitrarily higher number of frequently used functions to a limited number of physical function keys, and thereby allow a fast and comfortable input of these functions by way of the limited number of physical keys without increasing the number of function keys. In other words, the device according to the invention permits an increased input efficiency in the case of a possibly reduced space requirement for the physical keys on the instrument panel of a vehicle.

According to one aspect, a control unit is described for an information and communication system of a vehicle. The control unit is equipped to receive a sequence of sensor signals. The sequence of sensor signals comprises a sequence of sensor signals of different proximity sensors of corresponding different mechanical function keys. The mechanical (i.e. physical) function keys are typically arranged in a one-dimensional or two-dimensional keypad. Usually at least one proximity sensor is assigned to the individual mechanical function keys, which proximity sensor generates a sensor signal when a physical body (for example, an object or a user's finger) approaches the assigned function key. The at least one proximity sensor may be arranged, for example, below, inside or in the direct proximity of the mechanical function key. The sequence of sensor signals can therefore reflect a temporal sequence of the approach of the physical body toward the assigned different function keys.

Corresponding first functions of the information and communication system of the vehicle are assigned to the mechanical function keys. These first functions may, for example, be predefined by a user. The mechanical function keys are set up for triggering the corresponding assigned function when the function key is operated. For example, by operating a function key, a triggering signal can be generated by the function key (for example, by a switch or a contact of the mechanical function key), which is received by the control unit. By means of the triggering signal and by means of a function list, the control unit can then determine the first function for the operated function key and trigger the implementation of the first function.

The control unit is set up for detecting, from the sequence of the sensor signals, a swiping event over (or on or above the surface of, or in the direct proximity of the, or on the) mechanical function keys. A swiping event may, for example, comprise the movement of the physical body over at least two (adjacent) mechanical function keys. The at least two mechanical function keys may, for example, be horizontally or vertically adjacent. Furthermore, the at least two mechanical function keys may directly adjoin one another. The movement over the at least two function keys is detected by the proximity sensors of the mechanical function keys and results in a sequence of at least two sensor signals (corresponding to the respective proximity sensors). A swiping event can therefore comprise the condition that the sequence of sensor signals corresponds to the sensor signals of proximity sensors of corresponding (directly) adjacent mechanical function keys. The control unit can be equipped to check whether this condition has been met.

Furthermore, a swiping event may comprise the condition that a time interval between at least two mutually successive sensor signals of the sequence of sensor signals is shorter than a sensor time interval (for example, 0.5 seconds or 1 second). The control unit may be equipped to examine whether this condition has been met. In other words, in an embodiment, a swiping event may be present only when the movement over the at least two (adjacent) function keys takes place at a minimum speed.

The requirement of the minimum speed or of the maximal time internal may be used for separating the swiping event from an event in which the user wants to select a specific function key and, in the process, slides (relatively slowly) over different function keys of the keypad (in the present document, the latter event is called a detail event).

The control unit is equipped for assigning corresponding second functions of the information and communication system to the mechanical function keys when a swiping event is detected. In other words, a user is enabled to assign new (i.e. second) functions to the mechanical function keys by means of a swiping movement over at least two adjacent function keys. The second functions generally differ from the first functions. Typically, the second functions of the function keys can also be predefined by the user. As a result of the assignment of the new, second functions, the function keys are now equipped to initiate the respectively assigned second function (and no longer the respectively assigned first function) when a function key is operated.

The control unit may further be equipped for displaying a graphic output (or abbreviated as "output") on a video screen of the information and communication system. The video screen may be a dedicated video screen, which is mounted in the direct proximity of the keypad, and is provided specifically for the display of the graphic output. As an alternative, it may be a central video screen of the information and communication system, on which also information of other applications of the information and communication system (for example, radio, navigation, audio, etc.) is displayed. The graphic output may comprise function descriptions for the first and/or second functions assigned to the mechanical function keys. The respective function descriptions may comprise pictorial elements (such as icons) and/or written elements (such as numbers, names, etc.), and thereby describe the function for be triggered by means of the function key (for example, a radio function, a navigation function, a telephone function, an audio function).

In particular, the graphic output may comprise a first page with the function descriptions of the first functions and a second page with the function descriptions of the second functions. The control unit may then be equipped to change from the display of the first page of the graphic output to the display of the second page of the graphic output when the swiping event is detected. As a result, a user may be given the impression that, by means of a swiping motion over the keypad, he can scroll forward or backward between different pages of the graphic output (and therefore between different groups of functions, i.e. the group of first functions and the group of second functions).

The control unit may be equipped for detecting a detail event from the sequence of sensor signals, a detail event comprising that the time interval between at least two successive sensor signals of the sequence of sensor signals is greater than a sensor time interval. In other words, a detail event comprises a relative slow movement of the physical body over the at least two adjacent function keys. This relative slow motion can be interpreted by the control unit as a searching by the user for the desired function and the desired function key. For supporting this search, the control unit can be equipped for highlighting at least one function description of the first functions in the graphic output. Typically, the highlighting in the graphic output follows the user's motion, so that, according to the sequence of the function keys, over which the motion takes place, the respective function descriptions are highlighted.

The control unit may also be equipped for determining a direction of the swiping event from the sequence of sensor signals. Conceivable directions of the swiping event are, for example, horizontal from the left to the right, horizontal from the right to the left, vertically upwards, and vertically downwards. The control unit may therefore be equipped to determine the second functions, which are assigned to the mechanical function keys, depending on the direction of the swiping event. When the graphic output comprises a plurality of pages, the control unit may be equipped for displaying other pages with function descriptions of other functions, depending on the direction of the swiping event.

According to a further aspect, an input device for a vehicle is described. The input device comprises a keypad, which comprises at least two mechanical function keys. At least one proximity sensor respectively is assigned to the at least two mechanical function keys, the at least one proximity sensor being equipped for generating a sensor signal, when the presence of a physical body is detected in the (direct) proximity of the assigned mechanical function key. Thus, a sequence of at least two corresponding sensor signals can be generated by a movement over the at least two mechanical function keys. Corresponding first functions are assigned to the mechanical function keys, the mechanical function keys being equipped for triggering the respectively assigned function when the function key is operated.

The input device further comprises a control unit according to one of the aspects described in this document. The control unit is equipped for receiving the sequence of sensor signals of the proximity sensors of the at least two function keys. Furthermore, the control unit is equipped for detecting from the sequence of sensor signals a swiping event over the keypad and, when a swiping event is detected, assigning corresponding second functions to the at least two function keys. The input device may further comprise a video screen which is equipped for displaying a graphic output. The graphic output may comprise function descriptions for the first and/or second functions assigned to the mechanical function keys.

According to a further aspect, a process is described for the multiple allocation of different functions to mechanical function keys. The process comprises the detection of a sequence of sensor signals of different proximity sensors of corresponding different mechanical function keys. Corresponding first functions predefined by a user are assigned to the mechanical function keys. The mechanical function keys are equipped for triggering the respective assigned function when the function key is operated. The process further comprises the detection of a swiping event over the (or on the) different mechanical function elements from the sequence of sensor signals. In this case, a swiping event comprises the condition that the sequence of sensor signals corresponds to the sensor signals of proximity sensors of corresponding adjacent mechanical function keys. When a swiping event is detected, corresponding second functions predefined (by the user) are assigned to the mechanical function keys.

It should be noted that the processes, devices and systems described in this document can be used alone as well as in combination with other processes, devices and systems described in this document. Furthermore, any aspects of the processes, device and systems can be mutually combined in multiple manners. In particular, the characteristics of the claims can be mutually combined in multiple manners.

BRIEF DESCRIPTION OF THE DRAWINGS

In the following, the invention will be described in detail by means of embodiments:

FIG. 1b is a view of components of an example of an input device;

FIG. 2 is a view of an example of a use of the input device illustrated in FIG. 1a; and FIG. 3 is a view of an example of an input device for an information and communication system in a vehicle having a two-dimensional keypad.

DETAILED DESCRIPTION OF THE DRAWINGS

As indicated in the introduction, nowadays vehicles usually have information and communication systems whose multiple functions can be controlled by means of physical keys and by means of a video screen as an input/output user interface. The information and communication systems (IK systems) may particularly have function keys which can be flexibly linked with frequently used functions in order to thus enable the user to make a direct selection and directly trigger a frequently used function. Examples of functions are a calling function (for example, for calling a specific call number), a radio function (for example, for playing a specific radio station), a music playback function (for example, for the playback of specific predefined play list), a navigation function (for example, for determining a route to a predefined destination) etc.

Because of the limited available space on an instrument panel of the vehicle, the number of the physical (for example, mechanical) function keys and therefore also the number of directly selectable functions is limited. By means if this limited number of function keys, the efficiency of the input of functions of the information and communication system is in turn limited. It is therefore advantageous to increase the number of functions which can be triggered by means of a limited number of physical function keys.

Figure 1A:
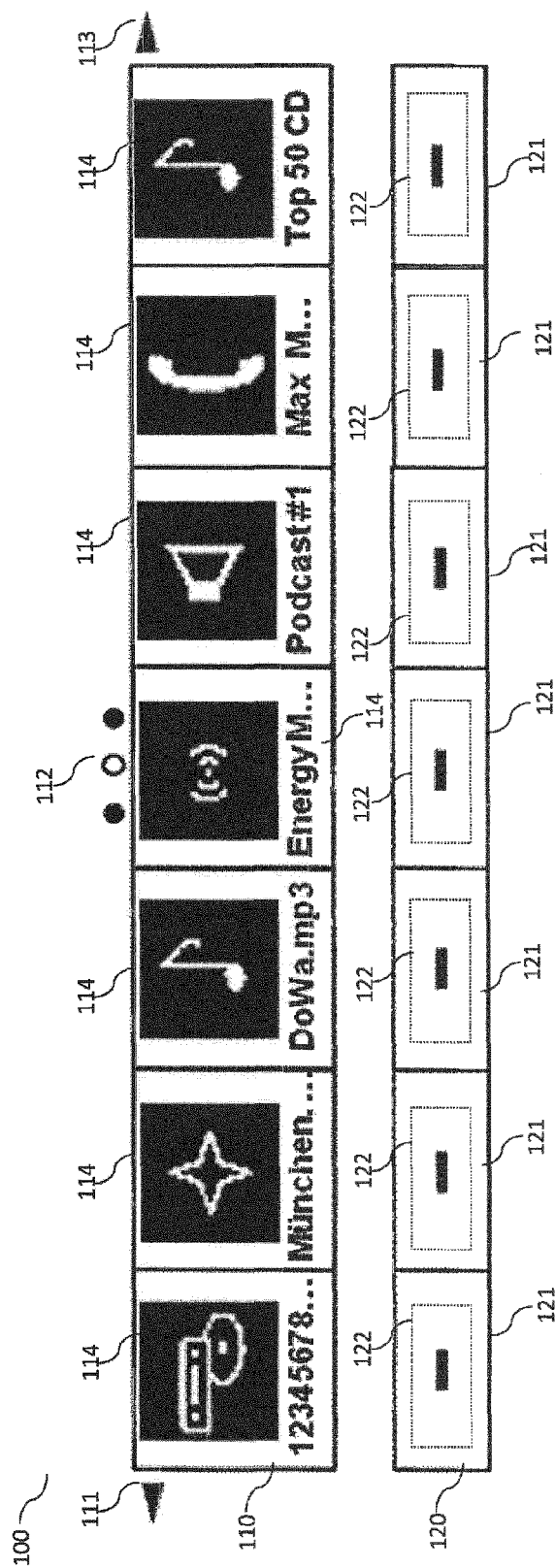
FIG. 1a is a view of an example of an input device for an information and communication system in a vehicle.

FIG. 1a illustrates an example of an input device 100, which permits the assignment of a plurality of functions to a function key. FIG. 1b illustrates an example of components of the input device 100. The input device 100 is typically part of the information and communication system of a vehicle. The input device 100 comprises a function keypad 120 with a plurality of function keys 121. The function keys 121 are physical, i.e. mostly mechanical keys. By pressing a key 121, typically electric contacts below the key 121 are closed or opened, or a switch is operated by pressing the key 121. As a result, a triggering signal is generated which is received and interpreted by a control unit 131 of the input device 100 or of the information and communication system. The information and communication system may comprise a stored function list, in which a specific triggering signal can clearly be assigned to a specific function of the system. This function list may be stored in a memory unit 132 of the input device or of the information and communication system. The function list can be changed by a user in order to thereby assign user-defined functions to the different function keys 121. By means of the function list, the control unit 131 can assign the received triggering signal of the operated function key 121 to a function of the information and communication system. The control unit 131 then triggers the assigned function of the information and communication system (for example, the playback of a specific radio station assigned to the function key). This is illustrated by the arrow 133 in FIG. 1b.

The function keys 121 comprise pertaining proximity sensors 122 which are equipped for determining that a user's finger (or a general physical body or object) is approaching the function key 121. Examples of proximity sensors 122 are, for example, capacitive proximity sensors, which react without contact, i.e. without direct contact, to approaches of a conducting or non-conducting physical body (for example, a finger or an object) by means of an electric sensor signal. Further examples are optical and/or electromagnetic proximity sensors. The sensor signal detected by the proximity sensor 122 is received by the control unit 131. The control unit 131 can then display, for example, the function linked to the function key 121, on a video screen 140 of the input device, in order to inform the user as to which function is filed on the function key 121.

The input device 100 is equipped for displaying a graphic output 110 (or abbreviated as output 110), which is associated with the functions of the information and communication system filed in the function keys 121. The graphic output 110 can be displayed on the video screen 140, for example, on a TFT (thin film transistor) video screen. The video screen 140 for the display of the graphic output 110 can be mounted as a dedicated video screen of the function keys 120 in the direct proximity (for example, above) the function keys 120 in order to display the functions of the function keys. As an alternative, the video screen 140 for the graphic output 110 may be the central video screen of the information and communication system, on which other aspects of the information and communication system are also displayed. The video screen 140 for the graphic output 110 could, for example, be the video screen that is used for displaying a route planning of the navigation unit of the information and communication system.

The display of the graphic output 110 on the video screen 140 can be made as a function of the detection of one or more sensor signals by the proximity sensors 122 of the keypad 120. For example, the input device 100 (or the control unit 131) may be equipped for displaying the graphic output 110 on the video screen 140 only when at least one sensor signal is detected (i.e. when it is detected that a physical body is approaching a function key 121). This is advantageous particularly when the graphic output 110 is displayed on a video screen 140 on which also other aspects of the information and communication system are displayed.

A plurality of function descriptions 114 can be displayed in the graphic output 110, each one of the plurality of function descriptions 114 describing the function of an assigned function key 121. A function description 114 may comprise, for example, a pictorial description of the assigned function (for example, by means of a pictogram or icon) and/or a (supplementary) written description of the function. The function descriptions 114 therefore enable a user to have a fast and precise overview of the functions that can be triggered by means of the function keys 121. As explained above, the display of the graphic output 110 may depend on the detection of a sensor signal by one of the proximity sensors 122. Thus, the graphic output 110 may, for example, be displayed on the video screen 140 only when it is detected that a user's finger is approaching a function key 121 of the function keypad 120.

The detection of the approaching of a physical body by a specific function key 121 of the keypad 120 (i.e. the generating of a sensor signal by the specific proximity sensor 122 of the specific function key 121) can be used for highlighting the function description 114 in the graphic output 110 associated with the function key 121, for example, for enlarging or displaying it in a different color in comparison to the other function descriptions 114. Furthermore, the user can be informed, for example, of additional details of the specific function which are filed on the specific function key 121.

In this document, it is suggested to use the proximity sensors 122 of the keypad 120 for being able to scroll or "swipe" within the graphic output 110 in order to thereby increase the number of functions which can be assigned to the function keys 121. In other words, it is suggested to provide several pages of the graphic output 110, in which case, each page of the graphic output 110 comprises different function descriptions 114 for different functions of the information and communication system. The proximity sensors 122 may be used for determining whether the user wants scroll or swipe between the pages of the graphic output 110 (for example, by detecting a fast "swiping" motion over a plurality of function keys 121) or whether the user would like to have a more precise display of the assignment of specific functions 121 within the just displayed page of the graphic output 110 (for example, by detecting a slow movement from one function key 121 to the next function key).

The graphic output 110 illustrated as an example in FIG. 1a comprises three pages. By means of a page position display 112, the user is informed of which of the pages of the graphic output 110 is displayed (in FIG. 1a, the center page, i.e. the second page of the graphic output 110 is displayed). A page display 111, 113 of the graphic output 110 can inform a user (for example, by displayed arrows on the right and/or left next to the function descriptions 114) as to the direction in which the scrolling can take place in order to display another page of the graphic output 110. The input device 100 can permit a rolling view of the pages of the graphic output 110, where continued scrolling, when the last page of the graphic display 110 is shown, causes the display of the first page of the graphic display 110, and where backward scrolling, when the first page of the graphic display 110 is shown, causes the display of the last page of the graphic display 110.

Figure 2:
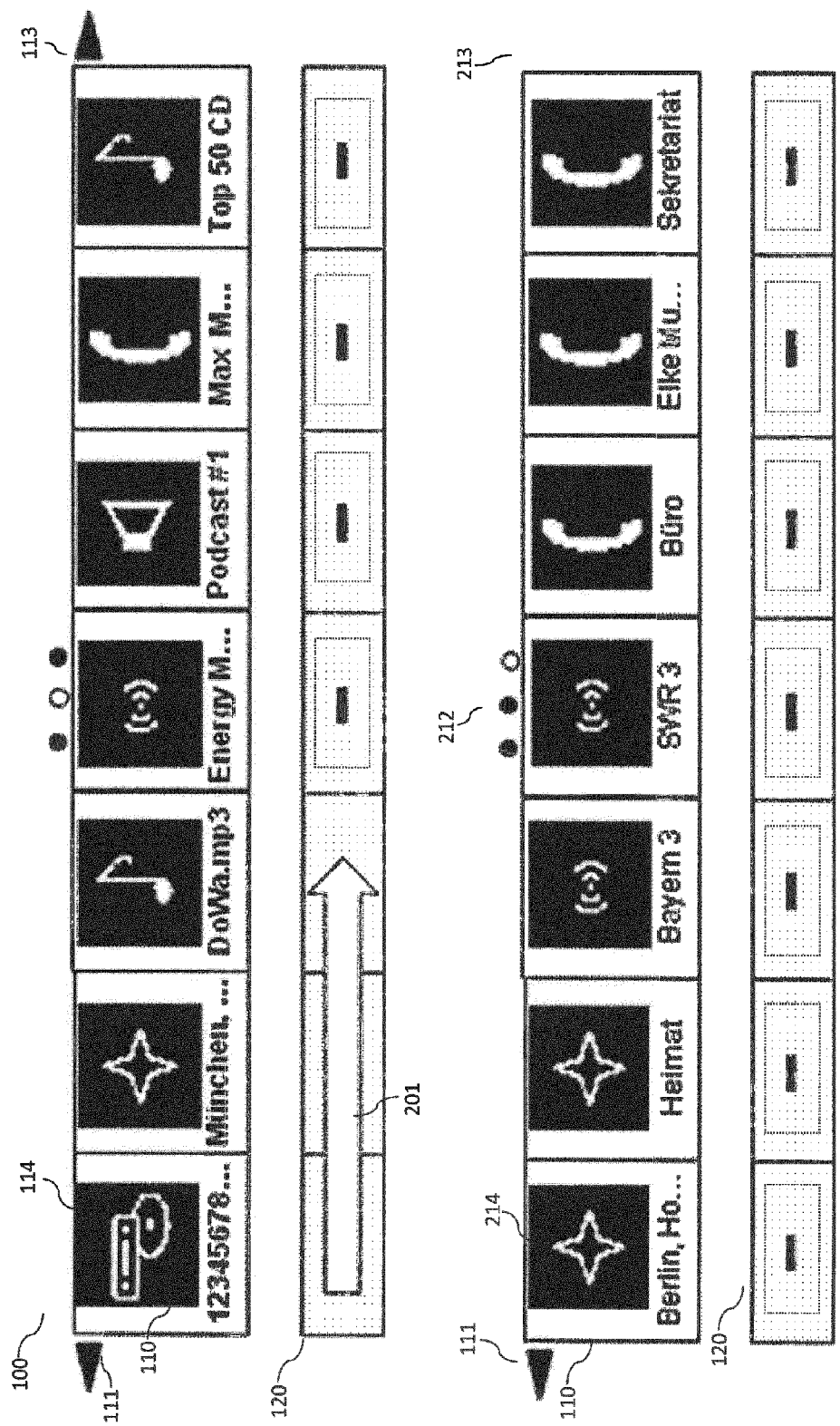

Navigating through the pages of the graphic display 110 enables the user to assign several different functions of the information and communication system to each function key 121 of the keypad 120. An example is illustrated in FIG. 2. By means of a fast swiping motion 201 over a plurality of function keys 121 (for example, at least over two function keys 121 or three function keys), the user can continue to scroll through the graphic output 110 and thereby receives the function descriptions 214 of further functions which can be triggered by means of the function keys 121. A changed scrolling position display 212 can indicate to the user which page of the graphic display 110 is being displayed. The scrolling display 111, 213 can indicate to the user in which direction a scrolling can take place from the current page of the graphic display 110. Thus, for example, the absence 213 of an arrow indicates that no continued scrolling can take place from the current page of the graphic display 110.

The control unit 131 of the input device 100 or the information and communication system may be equipped for detecting a plurality of input events on the basis of the triggering signals or sensor signals of the keypad 120. Examples of input events are, for example,

- a triggering event: Reception of a brief triggering signal of a specific function key 121; the brief triggering signal has a time duration that falls below a predefined triggering time interval (for example, 2 seconds; the brief triggering signal is triggered by a correspondingly brief pressing of the specific function key;
- an editing event: Reception of a long triggering signal; the long triggering signal has a time duration which is equal to or greater than the predefined triggering time interval; the long triggering signal is triggered by a correspondingly long pressing of the specific function key 121;
- a detail event: Reception of a temporally isolated sensor signal of a specific function key 121; here, "temporally isolated" means that, within a predefined sensor time interval (for example, 0.5 seconds or 1 second), no further sensor signal of another (adjacent) function key 121 is received; the isolated sensor signal is triggered when a physical body is approaching the proximity sensor 122 of the specific function key; and
- a swiping event: Reception of a sequence of sensor signals of at least two or three adjacent function keys 121; here, the time interval between two directly successive sensor signals of the sequence is equal to or shorter than the predefined time interval; this condition should be met for at least one pair of directly successive sensor signals; the sequence of sensor signals is triggered by the swiping of a physical body by way of the proximity sensors 122 of the adjacent function keys 121; the swiping event may be independent of from which of the two or three adjacent function keys 121 of the keypad 120 the sequence of sensor signals is received; the swiping event may be direction-dependent, depending on the direction in which the sequence of sensors signals is taking place; thus, in the case of a one-dimensional keypad 120, a swiping event "to the right" or "to the left" can be detected; and, in the case of a two-dimensional keypad 120 (see FIG. 3), a swiping event "to the right", "to the left", "upwards" and/or "downwards" can be detected.

The control unit 131 can trigger an action as a function of the detected input event and/or as a function of a state of the graphic output 110. A conceivable state of the graphic output 110 is, for example, the current page of the graphic output 110. The current page shows a current group of functions which are assigned to the function keys 121 of the keypad 120. The control unit 131 can therefore be equipped for triggering an action depending on the detected input events and/or depending on the group of functions which is assigned to the function keys. In the following, the behavior of the control unit 131 is described depending on the current state of the graphic output 110 which is synonymous with the behavior of the control unit 131 depending on the currently assigned group of functions.

The control unit 131 can use a predefined state machine which defines actions to be carried out depending on a state of the graphic output 110 (or depending on the assigned group of functions) and depending on an input event to be implemented. Examples of actions are illustrated in Table 1, wherein x=1, . . . , X (X>1, for example, X=2,3,4,5,6,7) identifies a specific page of the graphic output 110, and wherein y=1, . . . , Y (Y>1, for example, Y=2,3,4,5,6,7,8, 9,10) identifies a specific function key 121 of the keypad 120. As noted above, page x of the graphic output 110 corresponds to a group x of up to Y functions which may be assigned to the Y function keys 121.

TABLE 1

| State | Event | Action |
|---|---|---|
| $x^{th}$ Page of the output | Editing event of the $y^{th}$ function key | Initiating of an input function, which enables the user to assign a function of the IK system to the $y^{th}$ function key in the $x^{th}$ page of the output |
| $x^{th}$ Page of the output | Triggering event of the $y^{th}$ function key | Initiating of the function of the IK system assigned to the $y^{th}$ function key in the $x^{th}$ page of the output; i.e. initiating the $y^{th}$ function in the $x^{th}$ group of functions. |
| $x^{th}$ Page of the output | Detail event of the $y^{th}$ function key | Initiating the display of the highlighted and/or detailed function description of the function of the $y^{th}$ function key. |
| $x^{th}$ Page of the output | swiping event to the right | Initiating the display of the $(x + 1)^{th}$ page of the output; when x = X, initiating of the display of the $1^{st}$ page of the output; i.e. assigning the $(x + 1)^{th}$ or $1^{st}$ group of functions to the function keys. |
| $x^{th}$ Page of the output | swiping event to the left | Initiating the display of the $(x - 1)^{th}$ page of the output; when x = 1, initiating of the display of the $X^{th}$ page of the output; i.e. assigning the $(x - 1)^{th}$ or |

TABLE 1-continued

| State | Event | Action |
|-------|-------|--------|
|       |       | $X^{th}$ group of functions to the function keys. |

It therefore becomes possible to assign, on each of the plurality of pages of the display 110, a corresponding plurality of functions of the information and communication system of the vehicle to the function keys 121 of the keypad 120. By means of the swiping events, the user can select the $x^{th}$ page of the display 110, and by means of a triggering event of the $y^{th}$ function key (i.e. by operating the $y^{th}$ function key), trigger the implementation of the function, which is assigned to the $y^{th}$ function key in the $x^{th}$ page of the display 110. In other words, by means of swiping events, the user can assign the $x^{th}$ group of functions to the Y function keys, and, by means of the triggering event, trigger the $y^{th}$ function of the $x^{th}$ group of functions.

For this purpose, a function list can be stored in the memory unit 132, which function list permits the assigning of a function of the information and communication system to the triggering signal of the $y^{th}$ function key 121 in the $x^{th}$ page of the graphic display 110. In other words, the function list can assign to the triggering events of the Y functions keys 121 in each case up to X functions (in the X groups of functions).

For this purpose, the function list may contain corresponding entries for all x=1, . . . , X (i.e. for all pages of the display or for all groups of functions) and/or for all y=1, . . . , Y (i.e. for all function keys).

FIG. 3 illustrates an example of an input device 300 with a two-dimensional keypad 320 and a two-dimensional graphic output 310. The keypad 320 comprises physical function keys 321 with corresponding proximity sensors 321. The graphic output 310 comprises function descriptions 314 which are arranged in a corresponding manner with respect to the arrangement of the pertaining function keys 321. The graphic output 310 comprises a plurality of pages with different function descriptions 314. As an orientation aid through the plurality of pages of the graphic output 310, the graphic output may comprise page position displays 312 and/or page displays 311.

The pages of the graphic display 310 are arranged in a matrix, the matrix X comprising X rows and Z lines (Z>0, for example, Z=1,2,3,4,5,6,7). By means of swiping events to the right/to the left, the user can scroll through the X pages of the current $z^{th}$ line (z=1, . . . , Z). By means of upward/downward swiping events, the user can scroll through the Z pages of a current $x^{th}$ row. A function list can be stored in the memory unit 132, in which function list, a specific function of the information and communication system can be assigned to a page of the graphic display 310 of the $x^{th}$ row and the $z^{th}$ line for the $y^{th}$ function key (typically for all x=1, . . . , X; y=1, . . . , Y and z=1, . . . , Z). In other words, X times Z groups of functions can be stored in the function list, in each group, specific functions of the information and communication system being assignable to the Y function keys.

In the present document, a control unit, an input device and a process are described, which permit the assigning of a number of functions to a limited number of physical function keys, which number of functions exceeds the number of physical function keys. As a result, it becomes possible to reduce the number of required physical function keys, while the number of functions is the same or is even higher, and to thereby reduce the space requirement and the cost for physical function keys. On the other hand, the remaining function keys may be enlarged in order to thereby increase precision in the selection of functions. Furthermore, the experiential value when selecting functions can be increased for the user (by the additional swiping/page input). In addition, the efficiency of the input can be increased by an larger number of directly selectable functions of the information and communication system.

The present invention is not limited to the illustrated embodiments. It should particularly be noted that the description and the figures are to illustrate only the principle of the suggested method, devices and system.

What is claimed is:

1. A control unit for an information and communication system of a vehicle, wherein the control unit is configured to:
   receive a sequence of sensor signals of different proximity sensors of corresponding different mechanical function keys, wherein corresponding first functions of the information and communication system of the vehicle are assigned to each of the mechanical function keys, wherein each of the mechanical function keys is configured to trigger the corresponding assigned function when the mechanical function key is operated,
   detect from the sequence of sensor signals a swiping event over the mechanical function keys, wherein a swiping event comprises the fact that the sequence of sensor signals corresponds to the sensor signals of proximity sensors of corresponding adjacent mechanical function keys, and
   assign corresponding second functions of the information and communication system to each of the mechanical function keys when the swiping event is detected,
   wherein assigning corresponding second function to each mechanical function key comprises swipe-scrolling through a memory stored matrix of functions from a first sub-matrix of functions, the first sub-matrix consisting of the first functions, to a second sub-matrix of functions, the second set consisting of the second functions, and
   wherein the swiping event comprises the fact that a time interval between at least two successive sensor signals of the sequence of sensor signals is shorter than a sensor time interval.

2. The control unit according to claim 1, wherein the control unit is configured to display a graphic output on a video screen of the information and communication system, wherein the graphic output comprises function descriptions for the first functions and the second functions assigned to the mechanical function keys.

3. The control unit according to claim 2, wherein the graphic output comprises a first page with the function descriptions of the first functions and a second page with the function descriptions of the second functions, and
   the control unit is further configured to change from the display of the first page of the graphic output to the display of the second page of the graphic output when the swiping event is detected.

4. The control unit according to claim 3, wherein the control unit is further configured to:
   detect a detail event from the sequence of sensor signals, wherein the detail event comprises the fact that a time interval between at least two successive sensor signals of the sequence of sensor signals is greater than the sensor time interval, and highlight the function description of one of the first functions in the graphic output.

5. The control unit according to claim 3, wherein the control unit is further configured to:
   determine, when a swiping event is detected by way of the mechanical function keys, from the sequence of sensor signals, a direction of the swiping event, and
   determine the second functions assigned to the mechanical function keys as a function of the direction of the swiping event.

6. The control unit according to claim 3, wherein
   the mechanical function keys are arranged in a one-dimensional or two-dimensional keypad,
   at least one proximity sensor is assigned to each of the mechanical function keys, which each of the proximity sensors generate a sensor signal of the sequence of sensor signals when a physical body is approaching the assigned mechanical function key, and
   the sequence of sensor signals reflects a temporal sequence of the approach of the physical body toward the assigned different mechanical function keys.

7. The control unit according to claim 2, wherein the control unit is further configured to:
   detect a detail event from the sequence of sensor signals, wherein the detail event comprises the fact that a time interval between at least two successive sensor signals of the sequence of sensor signals is greater than the sensor time interval, and
   highlight the function description of one of the first functions in the graphic output.

8. The control unit according to claim 2, wherein
   the mechanical function keys are arranged in a one-dimensional or two-dimensional keypad,
   at least one proximity sensor is assigned to each of the mechanical function keys, which each of the proximity sensors generate a sensor signal of the sequence of sensor signals when a physical body is approaching the assigned mechanical function key, and
   the sequence of sensor signals reflects a temporal sequence of the approach of the physical body toward the assigned different mechanical function keys.

9. The control unit according to claim 2, wherein the control unit is further configured to:
   determine, when a swiping event is detected by way of the mechanical function keys, from the sequence of sensor signals, a direction of the swiping event, and
   determine the second functions assigned to the mechanical function keys as a function of the direction of the swiping event.

10. The control unit according to claim 1, wherein the control unit is further configured to:
    determine, when a swiping event is detected by way of the mechanical function keys, from the sequence of sensor signals, a direction of the swiping event, and
    determine the second functions assigned to the mechanical function keys as a function of the direction of the swiping event.

11. The control unit according to claim 10, wherein
    the mechanical function keys are arranged in a one-dimensional or two-dimensional keypad,
    at least one proximity sensor is assigned to each of the mechanical function keys, which proximity sensor generate a sensor signal of the sequence of sensor signals when a physical body is approaching the assigned mechanical function key, and
    the sequence of sensor signals reflects a temporal sequence of the approach of the physical body toward the assigned different mechanical function keys.

12. The control unit according to claim 1, wherein
    the mechanical function keys are arranged in a one-dimensional or two-dimensional keypad,
    at least one proximity sensor is assigned to each of the mechanical function keys, which each of the proximity sensors generate a sensor signal of the sequence of sensor signals when a physical body is approaching the assigned mechanical function key, and
    the sequence of sensor signals reflects a temporal sequence of the an approach of the physical body toward the assigned different mechanical function keys.

13. An input device for a vehicle, wherein the input device comprises:
    a memory storing a matrix of functions, the matrix comprising: a first sub-matrix consisting of first functions, and a second sub-matrix consisting of second functions;
    a keypad, which comprises at least two mechanical function keys, wherein, in each case, at least one proximity sensor is assigned to each of the at least two mechanical function keys, wherein the proximity sensors are equipped for generating a sensor signal when the presence of a physical body is detected in the direct vicinity of the assigned mechanical function key, wherein corresponding first functions are assigned to each of the mechanical function keys, wherein each of the mechanical function keys are configured to trigger the respectively assigned function when the mechanical function key is operated; and
    a control unit configured to:
        receive a sequence of sensor signals of the at least two mechanical function keys,
        detect from the sequence of sensor signals a swiping event over the keypad, and
        assign corresponding second functions to the at least two mechanical function keys when a swiping event is detected, wherein assigning corresponding second functions comprises swipe-scrolling through the matrix from the first sub-matrix to the second sub-matrix, and
    wherein the swiping event comprises the fact that a time interval between at least two successive sensor signals of the sequence of sensor signals is shorter than a sensor time interval.

14. The input device according to claim 13, wherein the input device further comprises:
    a video screen which is equipped to display a graphic output, wherein the graphic output comprises function descriptions for at least one of the functions assigned to the mechanical function keys.

15. A process for the multiple assignment of functions to the mechanical function keys, wherein the process comprises the acts of:
    detecting a sequence of sensor signals of different proximity sensors of corresponding different mechanical function keys, wherein corresponding predefined first functions are assigned to the mechanical function keys, wherein each of the mechanical function keys is equipped for triggering the respectively assigned function when the mechanical function key is operated;
    detecting a swiping event over the different mechanical function keys from the sequence of sensor signals, wherein a swiping event comprises the fact that the sequence of sensor signals corresponds to the sensor signals of proximity sensors of corresponding adjacent mechanical function keys and assigning of corresponding predefined second functions to each of the mechanical function keys when the swiping event is detected, wherein assigning corresponding second functions to each mechanical function key comprises swipe-scrolling through a memory stored matrix of functions from a first sub-matrix of functions, the first sub-matrix consisting of the first functions, to a second sub-matrix of functions, the second set consisting of the second functions, and wherein the swiping event comprises the fact that a time interval between at least two successive sensor signals of the sequence of sensor signals is shorter than a sensor time interval.

* * * * *